United States Patent [19]

Adams

[11] Patent Number: 4,715,182

[45] Date of Patent: Dec. 29, 1987

[54] ENERGY PRODUCING APPARATUS

[76] Inventor: Carl F. Adams, 6527 Coldwater Canyon Ave., North Hollywood, Calif. 91606

[21] Appl. No.: 40,558

[22] Filed: Apr. 13, 1987

[51] Int. Cl.$^4$ .............................................. F03B 17/02
[52] U.S. Cl. ......................................... 60/495; 60/398; 417/320
[58] Field of Search ................. 60/398, 495, 639, 698, 60/721; 417/337, 320

[56] References Cited

U.S. PATENT DOCUMENTS 4,583,368  4/1986  Nevenschwander ............. 60/398 X
4,619,593 10/1986  Molnar ............................. 60/398 X Primary Examiner—Stephen F. Husar
Attorney, Agent, or Firm—Jack C. Munro

[57] ABSTRACT

An energy producing apparatus which utilizes a vertically disposed silo formed within the earth. The silo is completely filled with water. A fluid cylinder, which contains a movable piston is to be submergible to the bottom of the silo and then returned back to the surface of the earth. During the submerging process, water is to be caused to enter a portion of the fluid cylinder moving the piston against pressurized gas. Upon the return of the fluid cylinder to the surface of the earth, this pressurized water is to be extracted and utilized to produce work within a work producing device such as a turbine.

9 Claims, 7 Drawing Figures

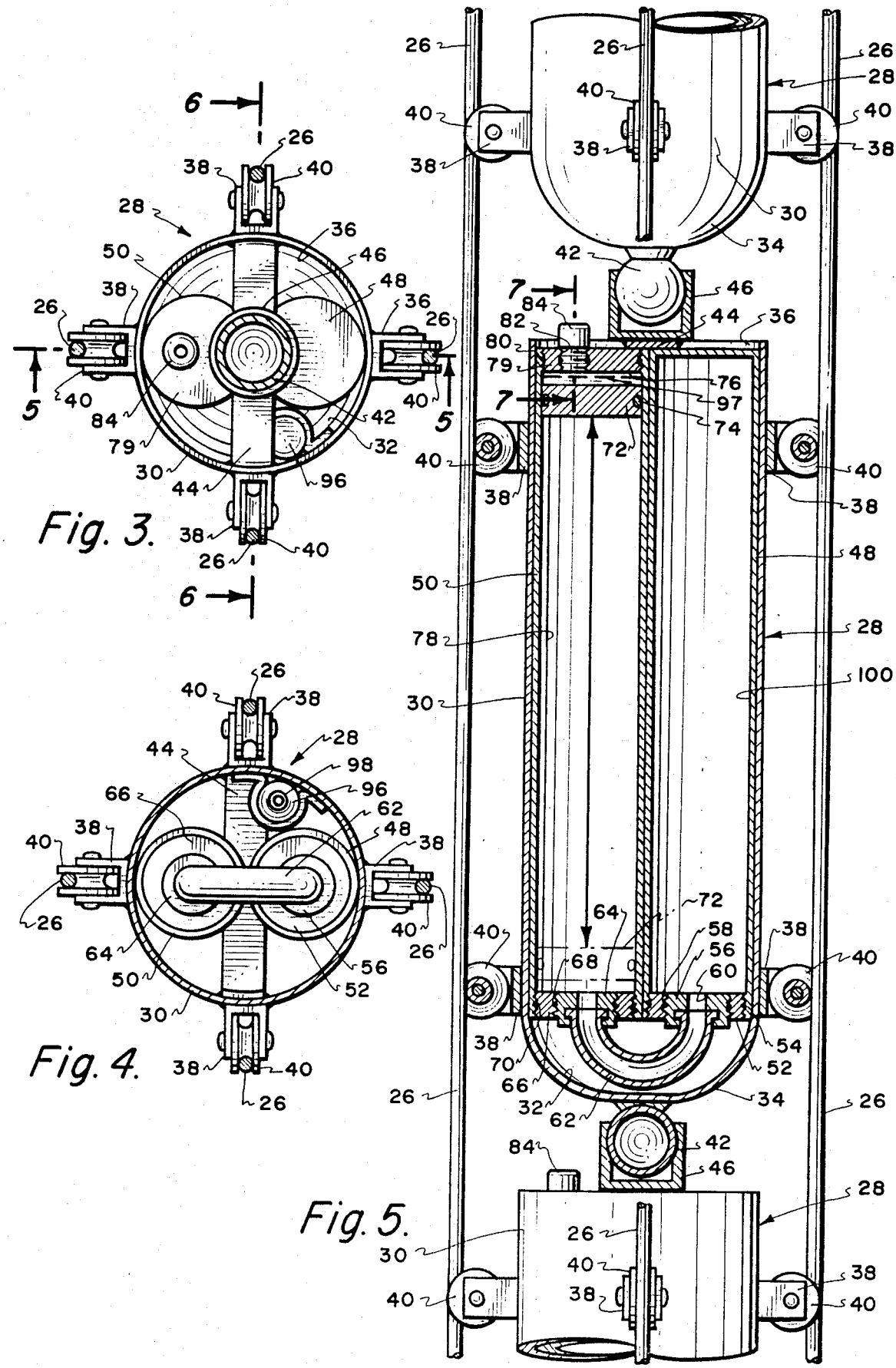

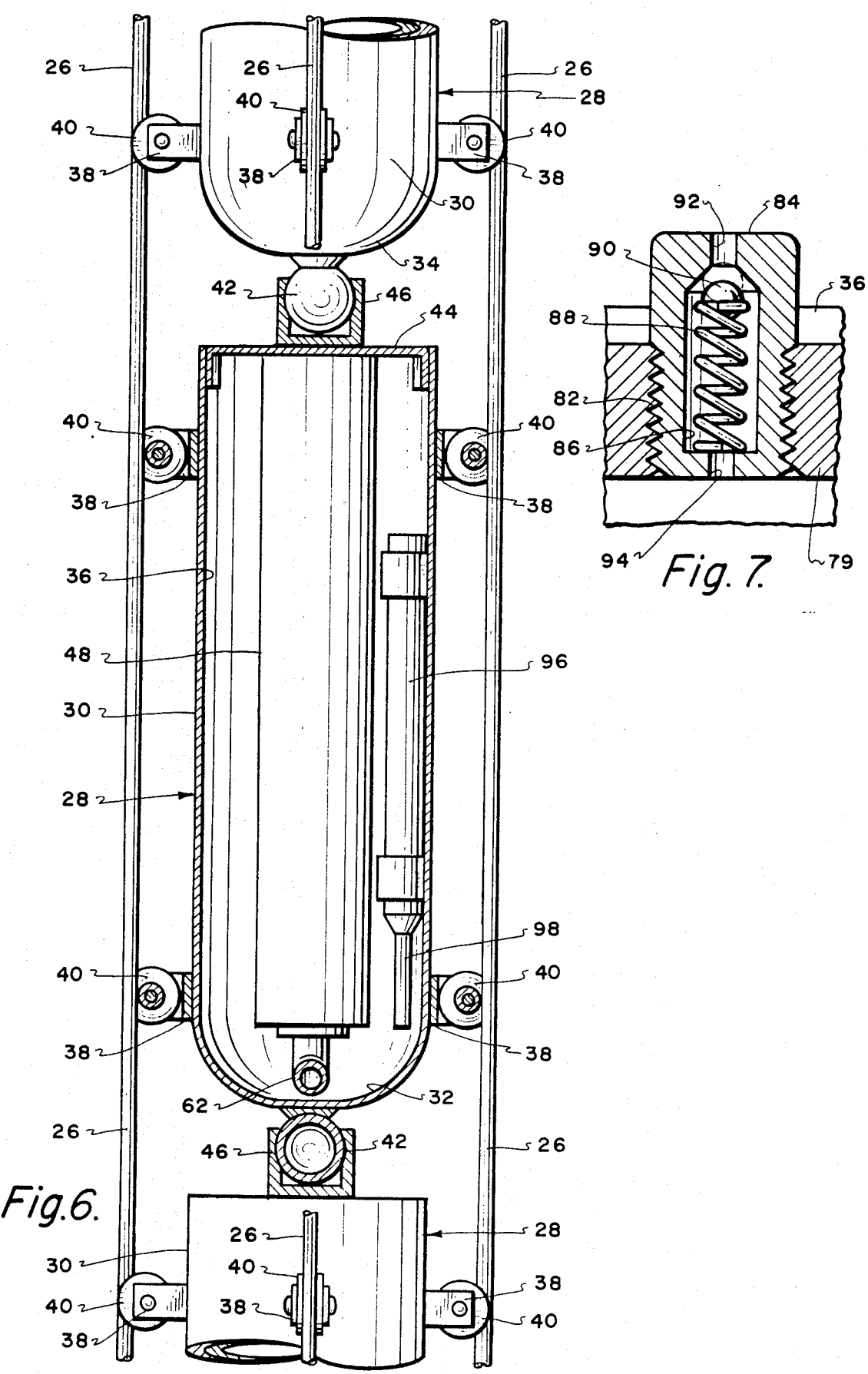

ENERGY PRODUCING APPARATUS

BACKGROUND OF THE INVENTION

The field of this invention relates to an energy producing apparatus for driving a rotary hydraulic motor, such as a turbine, which requires only a supply of water and a water reservoir as the power source.

It has long been known that any deep water source constitutes a potential source of energy. If an object is placed within the water that is lighter than the water, and that object was caused to be located at the lowest level of the deep water source, the object would then rise to the surface. This rising to the surface constitutes a potential energy source if that force could in some way be captured. Additionally, and more importantly, is the pressure created by the force of gravity within the water. Gravity causes the water located at the bottom of the deep reservoir to be pressurized to a much greater extent than the water located at the top of the deep water reservoir. This pressurized water, if it could be captured and brought to the surface, could be utilized to operate a work producing device such as a turbine or hydraulic motor.

Previous to the present invention there has not been known any apparatus which has been able to take advantage economically of the pressurized water located at the bottom of a deep water reservoir.

SUMMARY OF THE INVENTION

The utilization of a deep water reservoir as a source of power has many advantages over known conventional types of energy sources. One of the advantages is that water is exceedingly abundant and lends itself to be used where needed anywhere on earth. The water is not depletable and therefore is inexhaustible. Use of the water in accordance with the subject matter of the present invention is pollution free, not creating any heat, noise, odor or radiation. Constructing a plant in accordance with the present invention involves no real limitation as to the location, although some locations will certainly be easier than other locations. After the construction of the plant of the present invention, no highly skilled or technological personnel are required for operation of the plant. The efficiency of the plant operated in accordance with the subject of this invention is exceedingly high and estimated that the value of the input is less than six percent of the value of the output. The only media used by the present invention is air and water. Nothin in the system of the present invention will contaminate or pollute, and the water may be recycled where water is in short supply. Probably the most outstanding feature of the present invention is that no earthly material is consumed. The forms of energy that are the closest to the present invention are natural waterfalls and dams. But, natural waterfalls and dams do not recycle water, are limited in number and are generally located within remote areas. Utilizing the subject matter of the present invention there is no disruption to the landscape and no interfering with living creatures. The only hazard involved within the present invention relates to the handling of pressurized containers. However, the handling of pressurized containers is a long established engineering practice so the danger is practically eliminated.

The subject matter of the present invention is to utilize a deep water reservoir. This deep water reservoir could be natural and be located within an ocean, sea or lake. Also, this deep water reservoir could be man-made. If man-made, a preferable depth would be about fourteen thousand feet below the surface of the earth. The approximate diameter of the reservoir would be fifteen to twenty feet and be basically U-shaped. The exit passage of the reservoir would normally be located several hundred feet from the entrance passage of the reservoir. In any event, the deep water reservoir, if man-made, can be referred to as a silo. Mounted within this silo is a track assembly. Low-frictionally mounted on the track assembly are a plurality of carriages. These carriages are connected together through the use of a ball and socket arrangement between each directly adjacent pair of carriages. The entire length of the track within the silo is occupied by these carriages. It is estimated that at an approximate fourteen thousand foot depth, there would be utilized almost one thousand in number of carriages. Each carriage includes a carriage housing. The fore end of the carriage housing is closed with the aft end of the carriage housing being open. The fore end is defined as the end which leads during movement of the carriage along the track. Within the carriage housing, there is located a fluid cylinder. This fluid cylinder has mounted therein a movable piston. This fluid cylinder is divided by the piston into a gas containing section and a water containing section. The gas containing section is completely closed and is to be initially prepressurized with gas to a predetermined level such as three thousand pounds per square inch. The wall of the cylinder includes a one-way valve which connects with the water containing section. This one-way valve will permit water from the silo to enter within the water containing section but will not permit water to normally escape therefrom. As the carriage is submerged, at approximately seven thousand feet (one-half of the total depth of the silo), the pressure of the water will be equal to the pressure of the air within the gas containing section. Therefore, the piston at this particular position will be balanced. As the carriage continues to move to the bottom of the silo, water will enter the water containing section and move the piston to compress the gas within the gas containing section. When the carriage is located at the bottom of the silo, this gas will be pressurized to approximately six thousand pounds per square inch with the water contained within the fluid cylinder being also at six thousand pounds per square inch. As the carriage now proceeds to rise to the surface of the silo, this pressurized water remains captured by the fluid cylinder. The carriage will naturally rise about ninety percent of the total distance to the surface. In order to complete the rise of the carriage to the surface, there is incorporated a small pressurized cylinder in conjunction with the carriage which when activated will release a gas to be contained by the carriage housing thereby adding additional buoyancy to the carriage housing sufficient to lift the carriage to the surface. The carriage is now removed from the silo and connected to an accumulator which will cause the pressurized water to be released within the accumulator. This accumulated pressurized water is then to be utilized to operate a work producing device such as a turbine or hydraulic motor.

BRIEF DESCRIPTION OF THE DRAWINGS

FIG. 3 is a view, partly in cross-section, taken along line 3—3 of FIG. 2 showing a top view of one of the carriages incorporated within the subject invention;

FIG. 4 is a view, partly in cross-section, taken in a direction opposite of that FIG. 3 taken along line 4—4 of FIG. 2;

FIG. 5 is a longitudinal view, partly in cross-section, of the in-line carriage arrangement utilized in conjunction with the silo of FIG. 2;

FIG. 6 is a cross-sectional view through one of the carriages taken along line 6—6 of FIG. 3; and FIG. 7 is a cross-sectional view through the water inlet valve utilized in conjunction with the carriage taken along line 7—7 of FIG. 5.

DETAILED DESCRIPTION OF THE SHOWN EMBODIMENT

Figure 1:
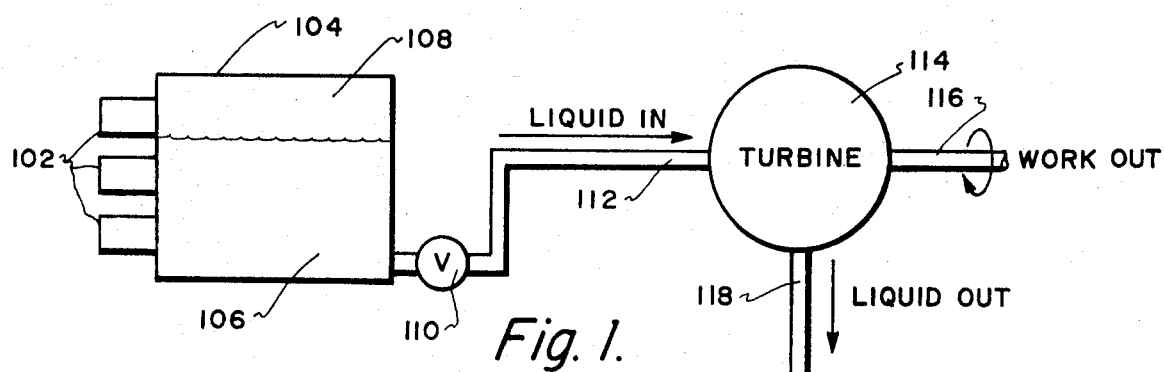
FIG. 1 is a block diagram which shows a typical work producing environment which is to be utilized in conjunction with the working fluid which is obtained by the apparatus of the present invention.
Figure 2:
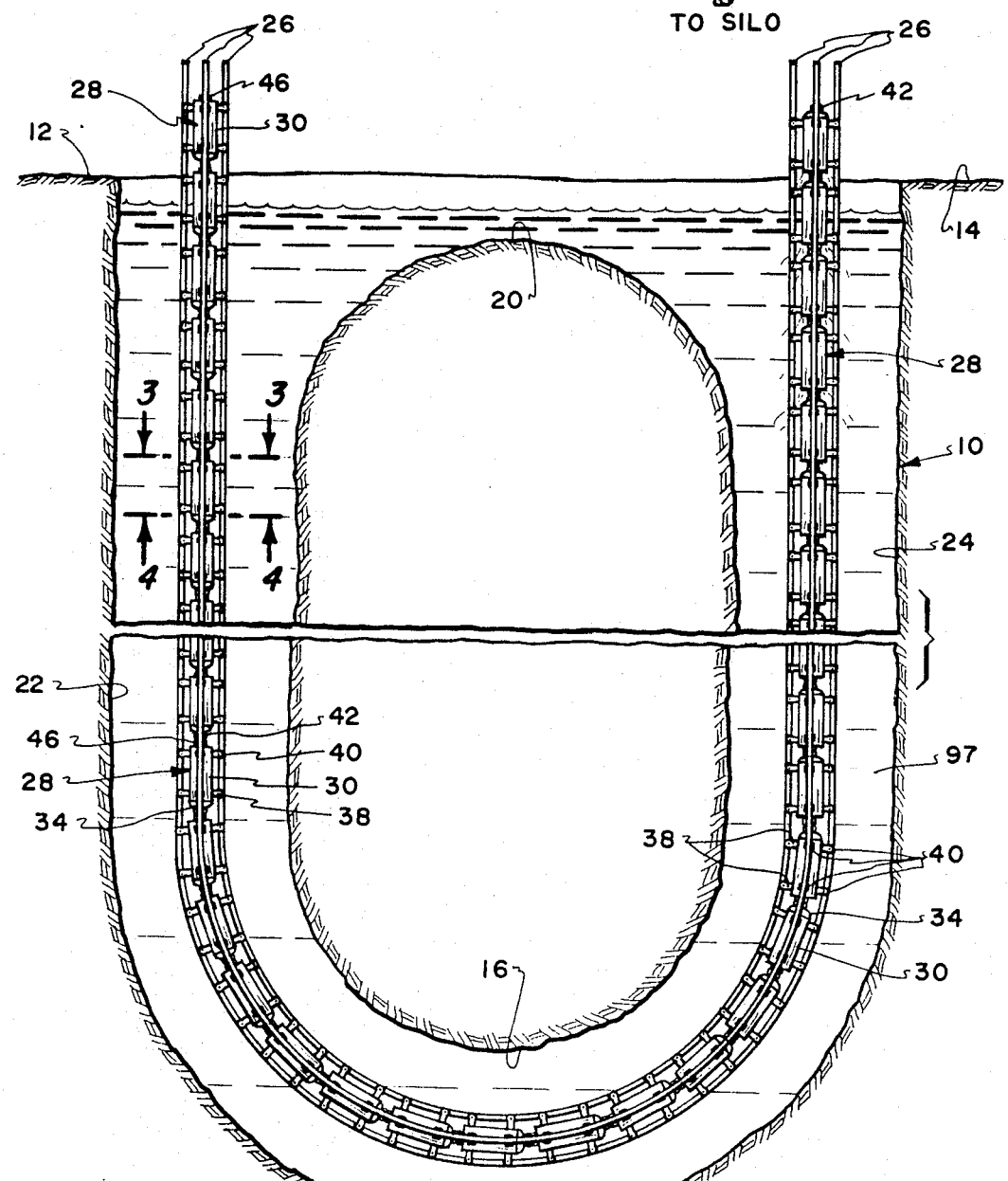
FIG. 2 is a diagrammatic cross-sectional view showing a typical silo which is to be utilized to obtain the pressurized working fluid to be supplied to the accumulator within FIG. 1.

Referring particularly to the drawings, there is shown in FIG. 2 a silo 10 being formed within the earth 12. The upper end of the silo is open at the surface 14 of the earth 12. The basic form of the silo 10 is that of a horseshoe configuration having an apex connecting passage 16 at the bottom 18 and a cross connecting passage 20 directly adjacent the surface 14. The apex connecting passage 16 and the cross connecting passage 20 connect the downwardly extending passage 22 and an upwardly extending passage 24. In normal practice there will actually be hundreds of feet between the entrance to the passage 22 and the exit from the passage 24 which are both located at surface 14. The passages 22 and 24 are tubular shaped as well as apex connecting passage 16. The reason for the cross connecting passage 20 is allow circulation of water 97 between the passages 22 and 24. Each of the passages 22 and 24 are located vertical. Vertical is defined so that the longitudinal center axis of each of the passages 22 and 24 are in alignment with the direction of gravity. In actual practice, the length of the passages 22 and 24 will be in excess of thirteen thousand feet. Although water 97 is the preferred liquid, other liquids could be used.

Although the subject matter of the this invention is described in conjunction with a man-made silo 10, it is considered to be within the scope of this invention that it could be utilized within a natural environment such as an ocean, a sea, or a lake. Possibly, a natural body of water could occupy the upper portion of the silo with the lower portion of the silo being man-made at the bottom of the lake.

Fixedly mounted to the side walls of the passages 16, 22 and 24 are four in number of rails 26. Rails 26 are evenly spaced apart and are to be utilized as a track for the purpose of low-frictionally supporting a plurality of carriage assemblies 28. Each carriage assembly 28 is identical with each other carriage assembly. In actual practice of this invention there will be something like four hundred seventy-two carriage assemblies 28 located in an in-line manner within the passages 16, 22 and 24.

Each carriage assembly 28 includes a carriage housing 30. Carriage housing 30 is formed basically in the shape of a thin walled cylinder which has an internal chamber 32. This carriage housing 30 is closed at the force end thereof forming a dome 34. The aft end of the carriage housing 30 is open forming an access opening 36.

Fixedly mounted to the exterior wall of the carriage housing 30 are a plurality of wheel mounting brackets 38. Fixedly mounted to the exterior portion of each wheel mounting bracket 38 is a wheel 40. For each carriage assembly 28 a pair of wheels 40 (spaced apart) is to engage with one of the rails 26, another of pair of wheels 40 (spaced apart) engages with another of the rails 26, a third pair of wheels 40 (spaced apart) engaging a still further rail 26 and the last pair of wheels 40 (spaced apart) engaging with the remaining rail 26.

Fixedly mounted onto the exterior surface of the dome 34 is a ball 42. Fixedly mounted across the access opening 36 of the carriage housing 30 is a brace 44. Fixedly attached to the brace 44 is a socket 46. The ball 42 of each carriage assembly 28 is to mate with the socket 46 of the carriage assembly 28 located just forward or leading of the first mentioned carriage assembly 28. The function of the ball 42 and sockets 46 is to connect together in an in-line relationship the carriage assemblies 28 and keep the carriage assemblies 28 at a precise spacing between each other. The reason for the use of the ball 42 and the socket 46 is to permit a limited amount of universal movement of one carriage assembly 28 with respect to another carriage assembly 28. This movement is so to permit the carriage assemblies 28 to reverse themselves from the downward position shown in the passage 22 to the upper position shown in the passage 24.

Fixedly mounted to the wall of the internal chamber 32 is a gas cylinder 48 and a liquid cylinder 50. The cylinder 48 has a plug 52 mounted in one end thereof. This plug 52 is tightly sealed by seal 54 to the cylinder 48. The function of the seal 54 is to prevent leakage of gas contained within the cylinder 48. Cylinder 48 will have a fill valve (not shown).

Centrally disposed within the plug 52 is an inner plug 56. An appropriate airtight seal 58 is located between the inner plug 56 and the outer plug 52. The inner plug 56 includes an opening 60. This opening 60 is to connect in an airtight manner with conduit 62. The free end of the conduit 62 acts also in an airtight manner with an inner plug 64. The inner plug 64 is screw threadingly received within an outer plug 66 with therebeing located a seal 68 therebetween. A seal 70 is located between the outer plug 66 and the wall of the cylinder 50.

Movably mounted within the cylinder 50 is a piston 72. The periphery of the piston 72 includes a seal 74 to form a fluid-tight connection between compartment 76 and compartment 78 of the cylinder 50. The aft end of the cylinder 50 is also closed by means of a plug 79. The peripheral surface of the plug 79 is again sealed by seal 80 to the wall of the cylinder 50.

Included within the plug 79 is a threaded hole 82. Mounted within the threaded hole 82 is a valve housing 84. The valve housing 84 defines a valve chamber 86 within which is located a coil spring 88 and a ball 90. The ball 90 is to seat against outer orifice 92 with the back end of the spring 88 abutting against inner orifice 94. Ball 90 will permit some of the water 97 located within the silo 10 to enter into the compartment 76. But ball 90, by the action of the spring 88, will normally prevent any water within the compartment 76 from being conducted through orifice 92 into the ambient.

Also mounted within the internal chamber 32 is a pressurized cylinder 96. This cylinder 96 has an outlet tube 98. The contents within the cylinder 96 to be discharged through the outlet tube 98 within the internal chamber 32. The operation of the energy producing apparatus of this invention is as follows:

Prior to connecting of the carriage assembly 28 to the rails 26 and entry into the passage 22, there is to be a quantity of gas, usually air, supplied under pressure within the gas containing section 100 of the cylinder 48. Pressurized gas is to be supplied, through a valve (not shown), in the gas containing section 100 to a level of approximately three thousand pounds per square inch. The gas within the gas containing section 100 will be conducted through the conduit 62 into compartment 78 of the cylinder 50. This pressurized gas will move the piston 72 directly adjacent the plug 79 essentially eliminating compartment 76. The container 96 is prepressurized with a quantity of gas such as air. There will be utilized some means (not shown) to activate the pressurized cylinder 96 at the appropriate time. However, this particular activation means is not shown.

The carriage assembly 28 is then installed on the rails 26 with the ball 42 caused to engage with socket 46 of the immediately leading carriage assembly 28. The dome end 34 leads so that it is first to enter the water 97.

The carriage assembly 28 then immediately begins to sink within the water 97. Normally this sinking movement will continue at a rate of about two miles per hour. As the cylinder assembly 28 continues to sink, the pressure of the water 97 increases. At about one-half the depth of the silo 10, the pressure of the water 97 will equalize the pressure of the gas contained within compartments 78 and 100. Further sinking of the carriage assembly 28 will result in water being conducted past ball 90 through orifice 94 into compartment 76. As a result, piston 72 begins to move within the compartment 78.

When the carriage assembly 28 reaches the bottom 18, the piston 72 will have moved to the dotted line in position shown in FIG. 5. At this particular time, the water contained within the compartment 76 is under a pressure of about six thousand pounds per square inch with the gas pressure contained within compartment 100 being also under six thousand pounds per square inch. The carriage assembly 28, during movement across apex passage 16, reverses in position as it starts to rise within passage 24. Because the water pressure now starts to decrease, further entry of the water into compartment 76 does not occur. Also, exit of this water is prevented by the ball 90 which closes orifice 92.

It is believed that the weight of the carriage assembly 28 moving down along passage 22 will be sufficient to move the carriage assemblies 28 upward within passage 24 to within approximately thirteen hundred to fourteen hundred feet of the surface 14. At that particular time, it will be necessary to activate the pressurized cylinder 96 and cause gas to be supplied within the internal chamber 32 about the cylinders 48 and 50. This gas will then create a sufficient buoyancy to cause the carriage assemblies 28 to continue to rise until it reaches the surface 14. However, in actual practice the cylinder 96 will be discharged as the carriage assembly 28 begins its upward path to the surface 14.

The activation of pressurized cylinders 96 at the appropriate time can be caused in many of numerous ways. One example would be by a mercury switch. Another example would be through the use of utilizing some kind of a mechanical trip mechanism. Also, instead of using cylinders 96 there could be used some propellant arrangement.

When the carriage assembly 28 has reached the surface, it will probably be moved on some kind of a surface rail system similar to rail system 26. The valve 84 will be connected to one of the connectors 102 of an accumulator 104. Accumulator 104 includes water 106 and air 108. The connectors 102 provide an airtight connection with the valve 84 and unseat the ball 90. The pressurized gas within the compartment 100 will then cause piston 72 to move adjacent the plug 80 and cause the liquid contained within compartment 76 to be moved through orifice 92 and discharged into the accumulator 108 and become part of water 106. During normal operation, because of there being a constant number of carriage assemblies 28 discharging liquid into the accumulator 104, the water 106 will be under a pressure of something exceeding three thousand pounds per square inch with the air 108 also being under the same pressure.

This pressurized water 106 is then conducted through a valve assembly 110, through conduit 112, to operate a conventional work producing device such as a turbine 114. The turbine 114 rotates a shaft 116 thereby producing work. The spent water of water 106 is then conducted through conduit 118 to be discharged back into silo 10 and become part of the water 97.

After the carriage assembly 28 has discharged the liquid into accumulator 104, the carriage assembly 28 is disengaged from the connector 102. The pressurized cylinder 96 is then repressurized and the carriage assembly 28 is then able to be re-used by being reconnected to the rails 26 and begin again the submerging within the silo 10.

For purpose of description, the piston 72 is shown slightly spaced from plug 79 with water 97 in this space defined as compartment 76. Since FIGS. 3, 4 and 5 are shown to be only a short distance below surface 14, in actual practice piston 72 would abut against plug 79 until the piston 72 started to move at approximately one-half the depth of silo 10. Also, ball 90 would be in the phantom line position of FIG. 7 until this one-half depth is obtained when the ball 90 would unseat to the solid line position.

What is claimed is:

1. An energy producing apparatus for obtaining a working fluid wherein the working fluid is to be used to operate a work producing device, said apparatus comprising:

a silo, said silo having a longitudinal center axis, said longitudinal center axis being located substantially vertical, said silo having an open top and a closed bottom, said silo being substantially filled with a liquid;

track means mounted within said silo, said track means extending from said open top to said closed bottom;

a carriage assembly, said carriage assembly having a carriage housing, said carriage housing having mounted thereon track engaging means, said track engaging means to connect with said track means and be movable thereon permitting movement of said carriage assembly between said open top and said closed bottom, said carriage housing having an internal chamber;

a fluid cylinder mounted within said internal chamber, said fluid cylinder defining an inner compartment, a piston movably mounted within said inner compartment, said piston dividing said inner compartment into a gas containing section and a liquid containing section;

a gas, said gas being located within said gas containing section;

an orifice formed within said fluid cylinder, said orifice connecting with said liquid containing section; and a valve mounted in conjunction with said orifice, said valve permitting flow of liquid into said liquid containing section, said valve normally preventing flow of liquid from said liquid containing section, whereby as said carriage assembly submerges deeper into said silo some of said liquid passes said valve into said liquid containing section thereby moving said piston against said gas containing section compressing said gas contained therein, upon the maximum amount of said liquid being located within said liquid containing section at said closed bottom said carriage assembly is then moved to said open top and removed from said silo with the said liquid contained within said liquid containing section being removed therefrom and utilized to produce work.

2. The energy producing apparatus as defined in claim 1 wherein:

buoyancy means connected to said carriage assembly, said buoyancy means to be activated at a particular time in order to assist in lifting of said carriage assembly within said liquid of said silo to thereby facilitate removal of said carriage assembly from said silo.

3. The energy producing apparatus as defined in claim 2 wherein:

said buoyancy means comprising a separate pressurized gas cylinder, said separate pressurized gas cylinder being mounted within said internal chamber.

4. The energy producing apparatus as defined in claim 3 wherein:

said carriage housing defining a fore end and an aft end, said aft end being open, said fore end being closed, said fore end leading during movement of said carriage assembly within said silo, upon said separate gas pressurized cylinder being activated the pressurized gas being released within said internal chamber and collecting directly adjacent said fore end.

5. The energy producing apparatus as defined in claim 4 wherein:

said fore end being smoothly contoured to minimize drag between said carriage housing and said liquid during movement of said carriage assembly within said liquid.

6. The energy producing apparatus as defined in claim 1 wherein:

said gas within said gas containing section being pre-pressurized to a predetermined level prior to initiating submerging of said carriage assembly within said silo.

7. The energy producing apparatus as defined in claim 1 wherein:

said carriage housing defining a fore end and an aft end, a ball being mounted on said fore end, a socket being mounted on said aft end, said ball of one said carriage assembly being adapted to connect with a said socket of another said carriage assembly with both said carriage assemblies being located in in-line relationship in respect to each other.

8. The energy producing apparatus as defined in claim 1 wherein:

said track means comprising a plurality of spaced apart rails, said track engaging means comprising a plurality of wheels.

9. The energy producing apparatus as defined in claim 1 wherein:

said liquid comprising water.

* * * * *